(12) United States Patent
Jakupca et al.

(10) Patent No.: US 8,258,215 B2
(45) Date of Patent: Sep. 4, 2012

(54) MIXED ALKYL-ALKYLARYL-PHENYL PHOSPHITE POLYMER ADDITIVE

(75) Inventors: Michael Jakupca, Canton, OH (US); Jacob M. Lance, Dover, OH (US); Nina Bersaglini, Magnolia, OH (US); Donald Stevenson, Dover, OH (US)

(73) Assignee: Dover Chemical Corporation, Dover, OH (US)

( * ) Notice: Subject to any disclaimer, the term of this patent is extended or adjusted under 35 U.S.C. 154(b) by 195 days.

(21) Appl. No.: 12/701,121

(22) Filed: Feb. 5, 2010

(65) Prior Publication Data
US 2011/0196079 A1 Aug. 11, 2011

(51) Int. Cl.
*C08G 18/77* (2006.01)
(52) U.S. Cl. ........................ 524/115; 524/151
(58) Field of Classification Search .................... 524/128
See application file for complete search history.

(56) References Cited

U.S. PATENT DOCUMENTS

| | | | |
|---|---|---|---|
| 6,362,260 B1 * | 3/2002 | Stevenson et al. | 524/115 |
| 6,824,711 B2 | 11/2004 | Stevenson et al. | |
| 7,199,170 B2 | 4/2007 | Archibald et al. | |
| 7,468,410 B2 | 12/2008 | Chafin et al. | |
| 7,470,735 B2 | 12/2008 | Stevenson et al. | |
| 2004/0180999 A1 * | 9/2004 | Stevenson et al. | 524/115 |
| 2009/0326112 A1 | 12/2009 | Gelbin et al. | |

FOREIGN PATENT DOCUMENTS
WO 2007/149143 12/2007
* cited by examiner

*Primary Examiner* — Doris Lee
(74) *Attorney, Agent, or Firm* — Hahn Loeser & Parks LLP

(57) ABSTRACT

A process to stabilize a polymer is described utilizing the step of adding a phosphite reaction product of a triphenyl phosphite or lower molecular weight trialkyl phosphite (e.g., trimethyl phosphite) or triaryl phosphite, with from approximately 1 to 2 moles of preferably a paracumyl phenol, and with from approximately 1 to 2 moles of at least $C_{12-20}$ carbon alkyl or $C_{12-20}$ alkenyl alcohol. In one embodiment of the invention, the phosphite reaction product is formula (I)

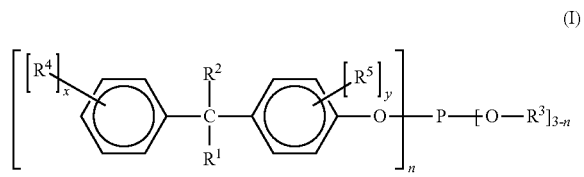

wherein
$R^1$ is independently selected from the group consisting of H and $C_{1-2}$ alkyls;
$R^2$ is independently selected from the group defined previously for $R^1$;
x is an integral value ranging from 0 to 4 inclusive;
y is an integral value ranging from 0 to 4 inclusive;
n is an integral value ranging from 1 to 2;
$R^3$ is independently selected from the group consisting of $C_{12-20}$ alkyl or $C_{12-20}$ alkenyl;
$R^4$ is independently selected from the group consisting of $C_{1-10}$, alkyl and $C_{9-15}$ arylalkyl;
$R^5$ is independently selected from the group defined previously for $R^4$.

15 Claims, 3 Drawing Sheets

Melt Flow Index
21.6kg/190°C

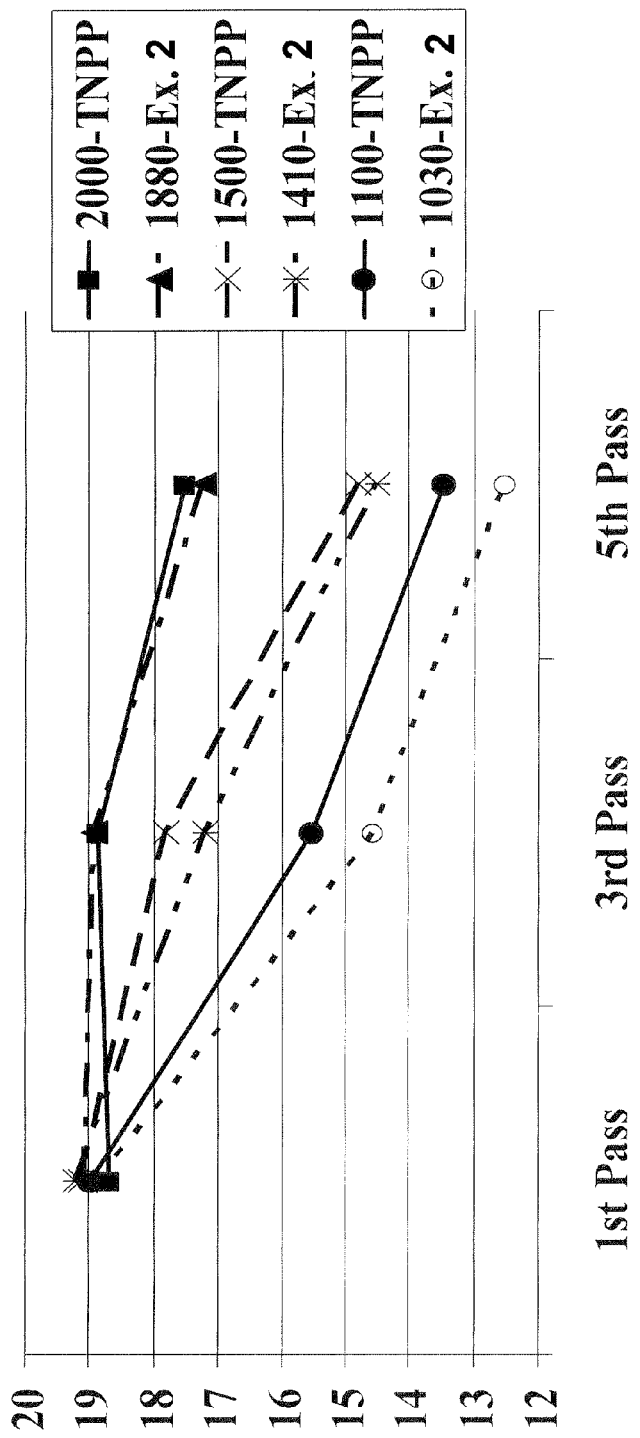
FIG. 1 - Melt Flow Index
21.6kg/190°C

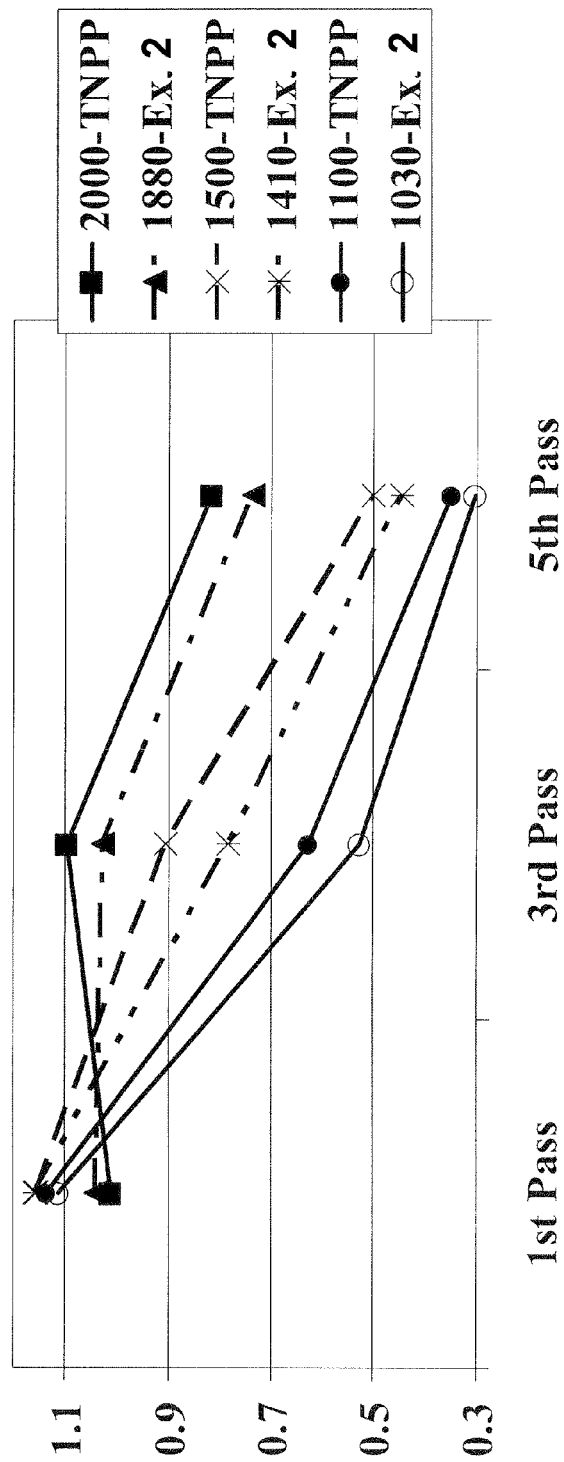

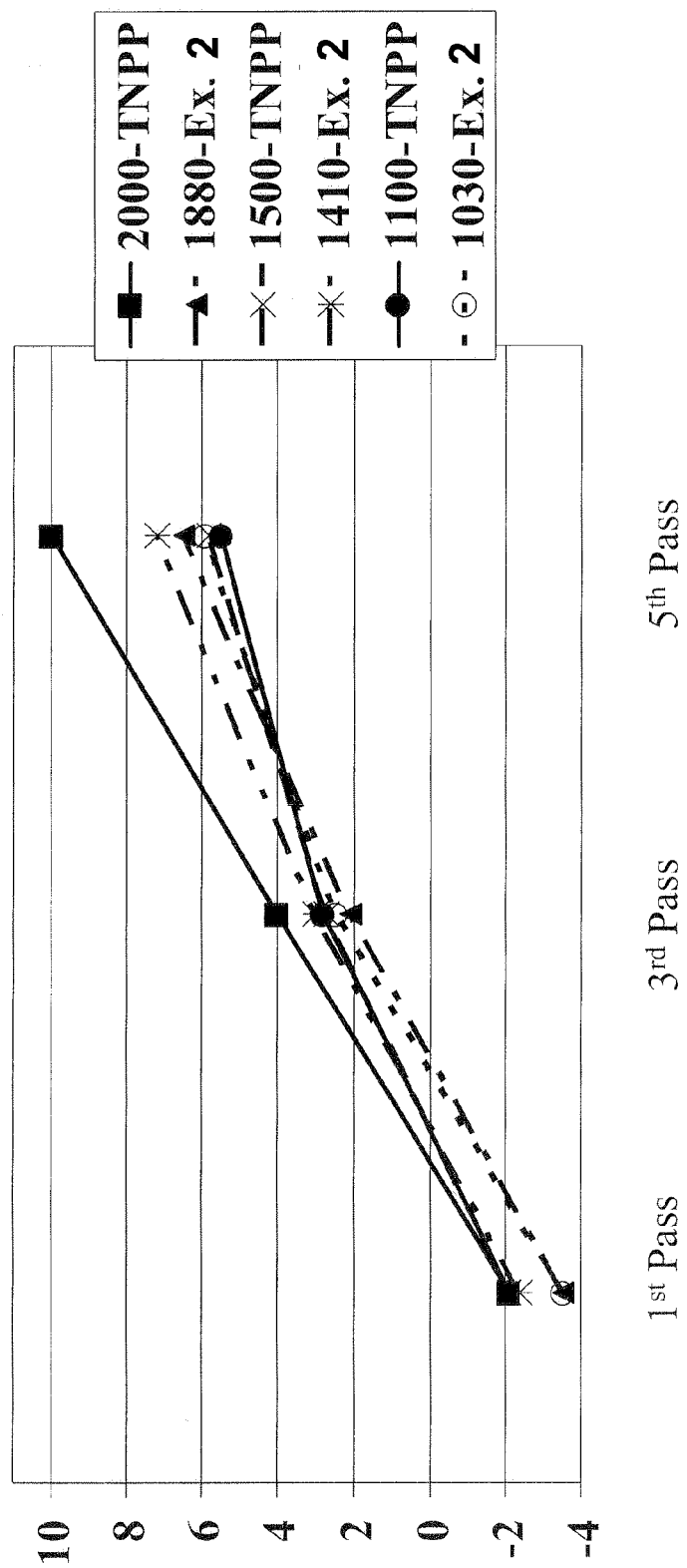
Fig. 3 - Yellowness Index

MIXED ALKYL-ALKYLARYL-PHENYL PHOSPHITE POLYMER ADDITIVE

TECHNICAL FIELD

The invention described herein pertains generally to an improved polymer composition which contains at least one phosphite additive which is selected from the group which includes mixed alkyl-alkylaryl-phenyl phosphites as antioxidant additives and a method for the preparation thereof.

BACKGROUND OF THE INVENTION

Organic phenolic phosphites are known for their antioxidant properties when added to polymers and other organic materials. See Plastics Additives Handbook, 4$^{th}$ Ed. R. Gaechter and H. Mueller Editors, 1993. One such example is tris(nonylphenyl)phosphite ("TNPP"),

a phosphite additive derived from nonylphenol. It is typically a mixture of ring and chain isomers of $C_9H_{19}C_6H_4OH$, which has been used for years to stabilize polymers, especially synthetic rubber and polyethylene products against oxidation and color degradation.

Organic alkylphenolic phosphites in general, are good secondary antioxidants, but there is a perceived problem that has developed in the scientific community that a number of commonly used compounds, including nonylphenol, may exhibit estrogenic activity, See Jobling, S., et al., "Detergent Components in Sewage Effluent are Weakly Estrogenic to Fish: An In-Vitro Study Using Rainbow Trout Hepatocytes," Aquatic Toxicology, Vol. 27 (1993) pp. 361-372 and Soto, A. M. et al., "p-Nonylphenol: An Estrogenic Xenobiotic Released from Modified Polystyrene," Env. Health Perspectives, Vol. 92 (1991) pp. 167-173. There is even concern with other traditionally used alkylphenols such as 2,4-dibutylphenol. See The Ministry of Heath, Labour and Welfare, Japan 2001, Chemical Substance Toxicity Test Report, 2,4 Di-tert-butylphenol, Vol 8 (1) 363-395.

Therefore, it is desirable to provide phosphites with lower contents of nonylphenol and which are not based on lower alkylphenols, especially 2,4-di-t-butylphenol. In the prior art, tris(nonylphenyl)phosphite has been made more hydrolytically stable by the addition of amines such as tris(isopropanol) amine ("TiPA"). Both tris(nonylphenyl)phosphite and tris(isopropanol) amine are FDA sanctioned for use in many polymer applications. U.S. Pat. Nos. 7,199,170 and 7,468,410 disclose phosphites that can replace TNPP but are either based on 2,4-di-t-butylphenol or lower alkylphenols. Any new phosphites which are to be considered as TNPP replacements need to be a liquid at room temperature and meet or exceed all the performance properties of TNPP. Important performance properties required include: good polymer compatibility, low odor in the polymer during processing, good melt flow and color stability in multi extrusion test, and good color stability in gas fade aging.

Therefore, it would be very desirable to produce a phosphite which does not suffer from the above drawbacks and yet maintains the performance characteristics of TNPP.

SUMMARY OF THE INVENTION

In accordance with the present invention, there is provided organic phosphite esters which have long alkyl chains (e.g., $C_{12}$ or greater, preferably $C_{12-20}$) and an alkylarylphenol, (e.g., para-cumylphenol). These phosphites are useful as thermal oxidative stabilizers in the polymeric compositions and the para-cumylphenol does not show comparable estrogenic activity to nonylphenol by in-vivo testing.

The invention also includes the synthesis of mixed alkyl-alkylaryl-phenyl phosphites.

The invention illustrates a process for the stabilization of polymers using the including the step of adding a phosphite reaction product of:

(a) a phosphite selected from the group consisting of $C_{1-20}$ trialkyl phosphite, $C_{6-30}$ triaryl phosphite, and $C_{3-10}$ tricycloaliphatic phosphite;

(b) with from approximately 1 to 2 moles of a phenol of formula (III)

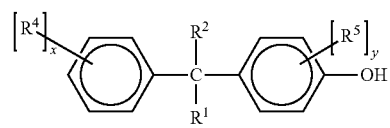

wherein
$R^1$ is independently selected from the group consisting of H and $C_{1-2}$ alkyls;
$R^2$ is independently selected from the group defined previously for $R^1$;
$R^4$ is independently selected from the group consisting of $C_{1-10}$, alkyl and $C_{9-15}$ arylalkyl;
$R^5$ is independently selected from the group defined previously for $R^4$.
x is an integral value ranging from 0 to 4 inclusive;
y is an integral value ranging from 0 to 4 inclusive;
(c) with from approximately 1 to 2 moles of at least one alcohol selected from the group consisting of $C_{12-20}$ alkyl alcohol and $C_{12-20}$ alkenyl alcohol.

In one aspect of the invention, the phosphite reaction product will be as illustrated by formula (I)

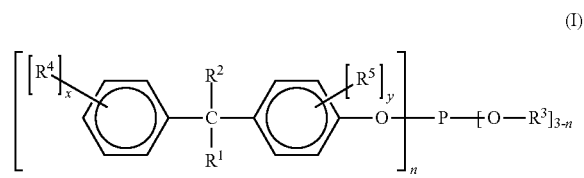

wherein
$R^1$ is independently selected from the group consisting of H and $C_{1-2}$ alkyls;
$R^2$ is independently selected from the group defined previously for $R^1$;
x is an integral value ranging from 0 to 4 inclusive;
y is an integral value ranging from 0 to 4 inclusive;
n is an integral value ranging from 1 to 2;
$R^3$ is independently selected from the group consisting of $C_{12-20}$ alkyl or $C_{12-20}$ alkenyl;
$R^4$ is independently selected from the group consisting of $C_{1-10}$, alkyl and $C_{9-15}$ arylalkyl;
$R^5$ is independently selected from the group defined previously for $R^4$.

In another aspect of the invention, the stabilized polymer will be selected from the group consisting of polyolefins, polyvinyl chloride and SBR rubbers, and more specifically, the polyolefin is selected from the group consisting of high density polyethylene, medium density polyethylene, low density polyethylene, linear low density polyethylene and polypropylene.

In another part of the invention, formula (I) will be as illustrated in formula (II) and is a mixture of phosphites,

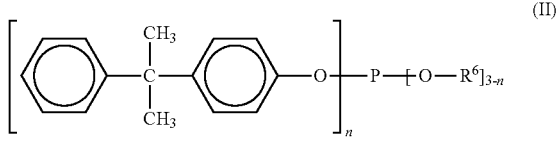

(II)

wherein
$R^6$ is selected from the group consisting of $C_{12-18}$ alkyl and $C_{12-18}$ alkenyl; and
n is an average value ranging between 1 and 2.

These and other objects of this invention will be evident when viewed in light of the drawings, detailed description and appended claims.

BRIEF DESCRIPTION OF THE DRAWINGS

FIG. 1 is plot of the impact of various TNPP additive replacements in linear low density polyethylene (added in ppm in the amounts identified in the legend of the graph in addition to the inclusion of Dovernox® 76, i.e., octadecyl 3,5-di-t-butyl-4-hydroxyhydrocinnamate added at 500 ppm) at high load (21.6 kg/190° C.) on the melt flow index in a co-rotating multi-pass twin screw extruder at 30 rpm;

FIG. 2 is plot of the impact of various TNPP additive replacements in linear low density polyethylene (added in ppm in the amounts identified in the legend of the graph in addition to the inclusion of Dovernox® 76, i.e., octadecyl 3,5-di-t-butyl-4-hydroxyhydrocinnamate added at 500 ppm) at low load (2.16 kg/190° C.) on the melt flow index in a co-rotating multi-pass twin screw extruder at 30 rpm; and FIG. 3 is a plot of the yellowness index (YI) value over various passes for the compositions used in FIGS. 1 & 2.

DETAILED DESCRIPTION OF THE INVENTION

The best mode for carrying out the invention will now be described for the purposes of illustrating the best mode known to the applicant at the time. The examples and figures are illustrative only and not meant to limit the invention, as measured by the scope and spirit of the claims.

As used herein, and unless otherwise stated, the term "alkyl" means straight and branched chain saturated acyclic hydrocarbon monovalent groups; said alkyl group may further optionally include one or more suitable substituents independently selected from the group consisting of amino, halogen, hydroxy, sulfhydryl, haloalkyl, alkoxy and the like. Specific non-limiting examples of straight-chain or branched alkyl groups are $C_{1-20}$ alkyls, e.g., methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl and stearyl groups.

As used herein, and unless otherwise stated, the term "alkenyl" means straight and branched chain unsaturated acyclic hydrocarbon monovalent groups; said alkenyl group may further optionally include one or more suitable substituents independently selected from the group consisting of amino, halogen, hydroxy, sulfhydryl, haloalkyl, alkoxy and the like. Specific non-limiting examples of the straight-chain or branched alkenyl groups are those having 2 to 30 carbon atoms wherein the position of the double bond may vary, such as butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, and octadecenyl groups.

As used herein, and unless otherwise stated, the terms "cycloaliphatic" refer to a mono- or polycyclic saturated hydrocarbon monovalent group having from 3 to 10 carbon atoms, or a $C_{7-10}$ polycyclic saturated hydrocarbon monovalent group having from 7 to 10 carbon atoms. Specific non-limiting examples of the cycloaliphatic or cyclic alkyl groups which may have substituents are cycloalkyl groups having 5 to 7 carbon atoms such as cyclopentyl, cyclohexyl and cycloheptyl groups, and the alkylcycloalkyl groups having 6 to 11 carbon atoms wherein the position of the alkyl group may vary, such as methylcyclopentyl, dimethylcyclopentyl, methylethylcyclopentyl, dimethylcyclopentyl, methylcyclohexyl, dim ethylcyclohexyl, methylethylcyclohexyl, diethylcyclohexyl, methylcycloheptyl, dim ethylcycloheptyl, methylcycloheptyl, and diethylcycloheptyl groups.

As used herein, and unless otherwise stated, the terms "aromatic" and "aryl" designate any mono- or polycyclic aromatic monovalent hydrocarbon group having from 6 up to 30 carbon atoms, including fused benzo-$C_{4-8}$ cycloalkyl groups (the latter being as defined above), all of the said groups being optionally substituted with one or more substituents independently selected from the group consisting of halogen, amino, haloalkyl, hydroxyl, sulfhydryl and nitro.

As used herein, and unless otherwise stated, the term "heterocyclic" means a mono- or polycyclic, saturated or mono-unsaturated or poly-unsaturated monovalent hydrocarbon group having from 2 up to 15 carbon atoms and including one or more heteroatoms in one or more rings, each of said rings having from 3 to 10 atoms (and optionally further including one or more heteroatoms attached to one or more carbon atoms of said ring, for instance in the form of a carbonyl or thiocarbonyl or selenocarbonyl group, and/or to one or more heteroatoms of said ring, each of said heteroatoms being independently selected from the group consisting of nitrogen, oxygen, sulfur, selenium and phosphorus, also including groups wherein a heterocyclic ring is fused to one or more aromatic hydrocarbon rings for instance in the form of benzo-fused, dibenzo-fused or naphtho-fused heterocyclic groups, including all possible isomeric forms thereof, wherein each carbon atom of said heterocyclic ring may be independently substituted with a substituent selected from the group consisting of halogen, nitro, $C_{1-7}$ alkyl (such as above defined, in particular methyl), $C_{3-7}$ alkenyl, trifluoromethyl, $C_{3-10}$ cycloalkyl, aryl, arylalkyl, alkylaryl, hydroxyl, sulfhydryl, alkoxy (such as above defined, in particular methoxy), aryloxy, arylalkyloxy, thio $C_{1-7}$ alkyl, thio $C_{3-10}$ cycloalkyl, thioaryl, arylalkylthio, cyano, carboxylic acid or esters thereof; depending upon the number of unsaturations in each of said rings, heterocyclic groups may be sub-divided into heteroaromatic (or "heteroaryl") groups and non-aromatic heterocyclic groups; when a heteroatom of the said non-aromatic heterocyclic group is nitrogen, the latter may be substituted with a substituent selected from the group consisting of $C_{1-7}$ alkyl, $C_{3-10}$ cycloalkyl, aryl, arylalkyl and alkylaryl (each of said groups being as defined herein).

As used herein, and unless otherwise stated, the term "alkoxy" refer to substituents wherein an alkyl group is attached to an oxygen atom through a single bond.

As used herein, and unless otherwise stated, the terms "halo" or "halogen" means any atom selected from the group consisting of fluoro, chloro, bromo and iodo.

As used herein, and unless otherwise stated, the term "arylalkyl" refers to an aliphatic saturated hydrocarbon monovalent group onto which an aryl group (such as defined above) is attached, and wherein the said aliphatic or aryl groups may be optionally substituted with one or more substituents independently selected from the group consisting of halogen, amino, hydroxyl, sulfhydryl, alkyl, haloalkyl and nitro. Specific examples of the arylalkyl groups are those having 7 to 40 carbon atoms wherein the alkyl group may be straight-chain or branched, such as benzyl, phenylethyl, phenylpropyl, phenylbutyl, phenylpentyl and phenylhexyl groups.

As used herein, and unless otherwise stated, the term "alkylaryl" refers to an aryl group (such as defined above) onto which an aliphatic saturated hydrocarbon monovalent group is attached, and wherein the said aliphatic or aryl groups may be optionally substituted with one or more substituents independently selected from the group consisting of halogen, amino, hydroxyl, sulfhydryl, alkyl, trifluoromethyl and nitro. Specific non-limiting examples of the unsubstituted or alkyl-substituted aryl groups are the aryl groups having 6 to 18 carbon atoms such as phenyl, diphenyl and naphthyl groups, and alkylaryl groups having 7 to 40 carbon atoms wherein the alkyl group may be straight-chain or branched and may be bonded to any position on the aryl group, such as tolyl, xylyl, ethylphenyl, propylphenyl, butylphenyl, pentylphenyl, hexylphenyl, heptylphenyl, octylphenyl, nonylphenyl, decylphenyl, undecylphenyl, dodecylphenyl, diethylphenyl, dibutylphenyl and dioctylphenyl groups. The alkylaryl groups may additionally have substituents including functional groups such as alkoxy, hydroxy, cyano, nitro, halides, carboxylic acids, etc.

As used herein, and unless otherwise stated, the term "acyl" refers to a substituent derived from an acid such as an organic monocarboxylic acid, a carbonic acid, a carbamic acid (resulting into a carbamoyl substituent) or the thioacid or imidic acid (resulting into a carbamidoyl substituent) corresponding to said acids, wherein said acids comprise an aliphatic, aromatic or heterocyclic group in the molecule. A more specific kind of "acyl" group within the scope of the above definition refers to a carbonyl(oxo) group adjacent to an alkyl, a cycloalkyl, an aryl, an arylalkyl or a heterocyclic group, all of them being such as herein defined.

More particularly, the present invention is directed to a non-xenoestrogenic arylalkyl phenol based phosphorus-containing stabilizer for organic materials wherein the stabilizer is selected from the group consisting of phosphorus-containing compounds of the structures generally shown by formula (I)

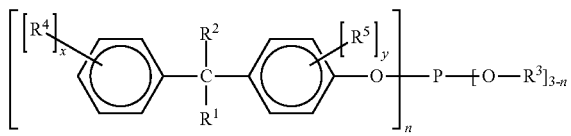

(I)

wherein $R^1$ is independently selected from the group consisting of H and $C_{1-2}$ alkyls;

$R^2$ is independently selected from the group defined previously for $R^1$;

x is an integral value ranging from 0 to 4 inclusive;
y is an integral value ranging from 0 to 4 inclusive;
n is an integral value ranging from 1 to 2;

$R^3$ is independently selected from the group consisting of $C_{12-20}$ alkyl or $C_{12-20}$ alkenyl;

$R^4$ is independently selected from the group consisting of $C_{1-10}$, alkyl and $C_{9-15}$ arylalkyl;

$R^5$ is independently selected from the group defined previously for $R^4$.

In one preferred embodiment of the invention, formula (I) is as illustrated in formula (II) and is a mixture of phosphites wherein n has a value of 1 and 2 in the phosphite mixture blend.

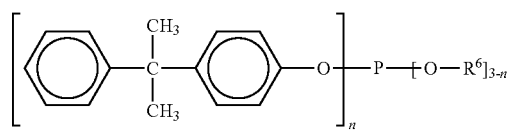

(II)

wherein $R^6$ is selected from the group consisting of $C_{12-18}$ alkyl and $C_{12-18}$ alkenyl; and n is a 1 or 2.

The following examples illustrate the components, as well as amounts, in the synthesis of the phosphite polymer additives. These examples are not considered to be limiting the scope of this invention. In the examples, p-cumylphenol ("PCP") and various $C_{12-18}$ alkyl alcohols were reacted with triphenyl phosphite ("TPP") using a sodium methoxide catalyst. To give the preferred phosphite additives, a phosphite composition mix which contains two (2) moles of PCP and one (1) mole of the alcohol and/or one mole of PCP and 2 moles of alkyl or alkenyl alcohol, the following reactants were employed and the resultant phosphites were analyzed for phosphorus, acid number, viscosity, refractive index, volatility (TGA) and specific gravity.

EXAMPLES

Example #1

1 Mol Para-Cumylphenol/2 mol 2-propylheptanol Phosphite (Mixed 2-propylheptyl, p-cumylphenyl phosphite)

To a three-neck 3000 mL flask equipped with a magnetic stirrer, a distillation column connected to a receiver and a vacuum system was added of 2-propylheptanol (750 g, 4.75 mol), para-cumylphenol (504 g, 2.38 mol), triphenyl phosphite (736 g, 2.37 mol), and 0.5 grams of sodium methoxide. The mixture was mixed well and heated to 150-152° C. under nitrogen and held at the temperature for 1 hour. The pressure was then gradually reduced to 0.3 mm Hg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 1 gram of Celite 545 filter aid was added and mixed for 0.5 hours. The product was then suction filtered to give a clear, colorless, non-viscous liquid with the properties described in Table 1.

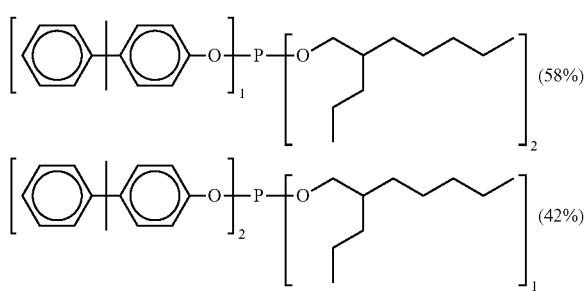

Example #2

1&2 mol Para-Cumylphenol, 2&1 mol $C_{12-14}$ Alcohol Phosphite (Mixed $C_{12-14}$ alkyl, p-cumylphenyl phosphite)

To a three-neck 500 mL flask equipped with a magnetic stirrer, a distillation column connected to a receiver and a vacuum system was added a mixture of lauryl and myristyl alcohol with a hydroxyl number of about 280 (65 g, 0.325 mol), para-cumylphenol (137 g, 0.646 mol), triphenyl phosphite (100 g, 0.322 mol), and 0.5 grams of sodium methoxide. The mixture was mixed well and heated to 150-152° C. under nitrogen and held at the temperature for 1 hour. The pressure was then gradually reduced to 0.3 mmHg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 0.5 gram of Celite 545 filter aid was added and mixed for 0.5 hours. The product was then suction filtered to give a clear, colorless, non-viscous liquid with the properties described in Table 1.

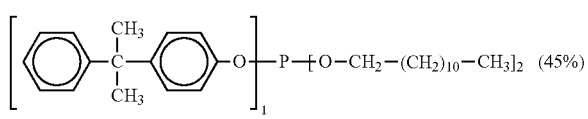

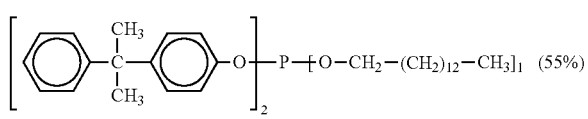

Example #3

1&2 mol Para-Cumylphenol, 2&1 mol Isodecyl Alcohol Phosphite (Mixed $C_{10}$ alkyl, p-cumylphenyl phosphite)

To a three-neck 5000 mL flask equipped with a magnetic stirrer, a distillation column connected to a receiver and a vacuum system was added of Isodecyl alcohol (1152 g, 7.291 mol), para-cumylphenol (1547 g, 7.297 mol), triphenyl phosphite (1552 g, 5.01 mol), and 3.0 grams of sodium methoxide. The mixture was mixed well and heated to 150-152° C. under nitrogen and held at the temperature for 1 hour. The pressure was then gradually reduced to 0.3 mmHg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 15 gram of Celite 545 filter aid was added and mixed for 0.5 hour. The product was then suction filtered to give a clear, colorless, non-viscous liquid with the properties described in Table 1.

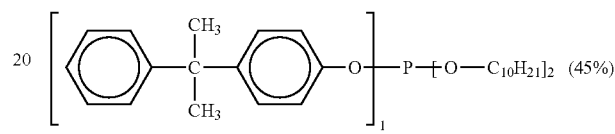

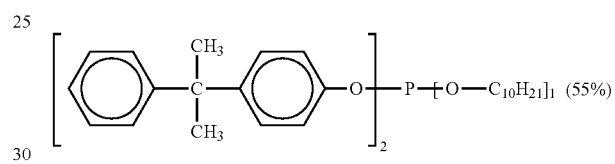

Example #4

1 mol Para-Cumylphenol, 2 mol Oleyl Alcohol Phosphite (Mixed $C_{18}$ alkenyl, p-cumylphenyl phosphite)

To a three-neck 500 mL flask equipped with a magnetic stirrer, a distillation column connected to a receiver and a vacuum system was added of oleyl alcohol (173 g, 0.644 mol), para-cumylphenol (68 g, 0.321 mol), triphenyl phosphite (100 g, 0.322 mol), and 0.5 grams of sodium methoxide. The mixture was mixed well and heated to 150-152° C. under nitrogen and held at the temperature for 1 hour. The pressure was then gradually reduced to 0.3 mmHg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 3 gram of Celite 545 filter aid was added and mixed for 0.5 hours. The product was then suction filtered to give a clear, colorless, non-viscous liquid with the properties described in Table 1.

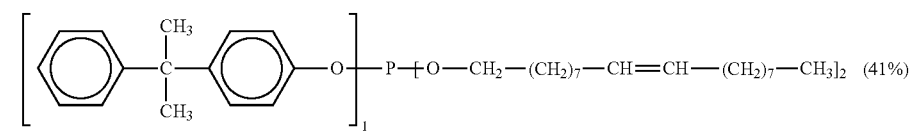

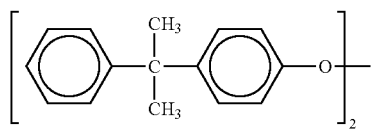 (59%)

Example #5

1&2 mol Para-Cumylphenol, 2&1 mol $C_{12-14}$ Alcohol Phosphite made from Tris Para-Cumylphenol Phosphite (Mixed $C_{12-14}$ alkyl, p-cumylphenyl phosphite)

To a three-neck 5000 mL flask equipped with a magnetic stirrer and a reflux column vented to a caustic scrubber was charged molten para-cumylphenol (300 g, 1.415 mol). The para-cumylphenol was heated to 70° C. Phosphorus trichloride (58.3 g, 0.425 mol) was then charged drop-wise into the flask via an addition funnel over 1 hour. HCl gas evolved vigorously during the addition. When the addition was complete the temperature was increased to 120 C over 1.5 hours. The reaction was then sparged with nitrogen gas for 15 hours at which time the off gas was no longer acidic. A mixture of lauryl and myristyl alcohol with a hydroxyl number of about 280 (90 g, 0.45 mol) and potassium carbonate (0.8 g) was charged into the flask. The mixture was mixed well and heated to 150-152° C. under nitrogen and held at the temperature for 1 hour. The pressure was then gradually reduced to 0.3 mmHg and the temperature was increased to 189-193° C. over a course of 2 hours. The reaction contents were held at 189-193° C. under the vacuum for approximately 2 hours at which point no more para-cumylphenol was distilling out. The vacuum was then broken by nitrogen and the crude product was cooled to ambient temperature. To the product 0.8 gram of Celite 545 filter aid was added and mixed for 0.5 hour. The product was then suction filtered to give a clear, colorless, non-viscous liquid with the properties described in Table 1.

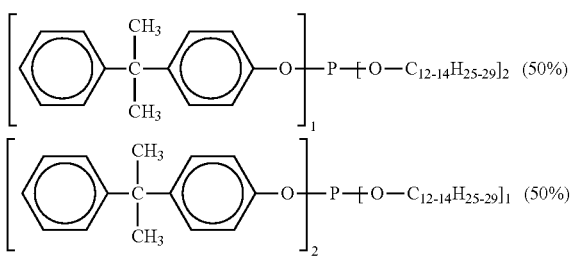

Example #6

1&2 mol Para-Cumylphenol, 2&1 mol $C_{16-18}$ Alcohol Phosphite (Mixed $C_{16-18}$ alkyl, p-cumylphenyl phosphite)

To a three-neck 500 mL flask equipped with a magnetic stirrer, a distillation column connected to a receiver and a vacuum system was added cetyl alcohol (~28%) and stearyl alcohol (~72%) with a hydroxyl number of about 211 (200 g, 0.752 mol), para-cumylphenol (159 g, 0.750 mol), triphenyl phosphite (155 g, 0.500 mol), and 0.8 grams of potassium carbonate. The mixture was mixed well and heated to 150-152° C. under nitrogen and held at the temperature for 1 hour. The pressure was then gradually reduced to 0.3 mmHg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 3 gram of Celite 545 filter aid was added and mixed for 0.5 hours. The product was then suction filtered to give a clear, colorless, non-viscous liquid with the properties described in Table 1.

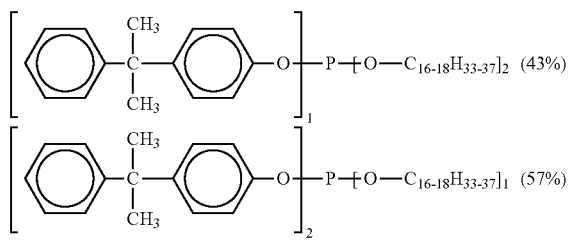

Example #7

1&2 mol Para-Cumylphenol, 2&1 mol $C_{12-18}$ Alcohol Phosphite (Mixed $C_{12-18}$ alkyl, p-cumylphenyl phosphite)

To a three-neck 500 mL flask equipped with a magnetic stirrer, a distillation column connected to a receiver and a vacuum system was added of Lorol Tech G fatty alcohols (48.3% lauryl alcohol, 18.1% myristyl alcohol, 10.7% cetyl alcohol, 21.5% stearyl alcohol) (103 g, 0.482 mol), para-cumylphenol (103 g, 0.486 mol), triphenyl phosphite (100 g, 0.322 mol), and 0.8 grams of potassium carbonate. The mixture was mixed well and heated to 150-152° C. under nitrogen and held at the temperature for 1 hour. The pressure was then gradually reduced to 0.3 mmHg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 3 gram of Celite 545 filter aid was added and mixed for 0.5 hours. The product was then suction filtered to give a clear, colorless, non-viscous liquid with the properties described in Table 1.

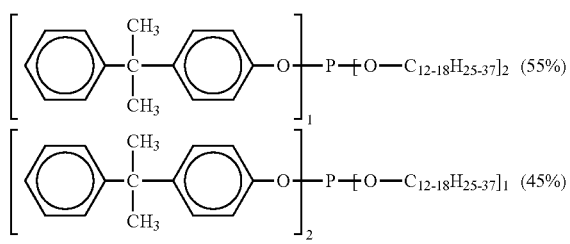

Example #8

1&2 mol Para-Cumylphenol, 2&1 mol Oleyl Alcohol Phosphite (Mixed $C_{18}$ alkenyl, p-cumylphenyl phosphite)

To a three-neck 500 mL flask equipped with a magnetic stirrer, a distillation column connected to a receiver and a vacuum system was added of oleyl alcohol (130 g, 0.485 mol), para-cumylphenol (103 g, 0.486 mol), triphenyl phosphite (100 g, 0.322 mol), and 0.6 grams of potassium carbonate. The mixture was mixed well and heated to 150-152° C. under nitrogen and held at the temperature for 1 hour. The pressure was then gradually reduced to 0.3 mmHg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 3 gram of Celite 545 filter aid was added and mixed for 0.5 hours. The product was then suction filtered to give a clear, colorless, non-viscous liquid with the properties described in Table 1.

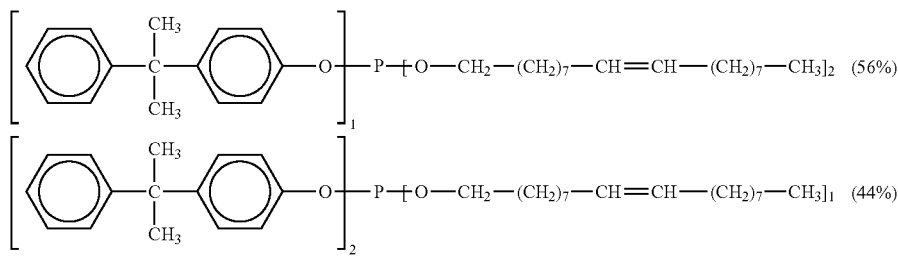

Example #9

1&2 mol Para-Cumylphenol, 2&1 mol Neodol 45 Phosphite (Mixed $C_{14-15}$ alkyl, p-cumylphenyl phosphite)

To a three-neck 500 mL flask equipped with a magnetic stirrer, a distillation column connected to a receiver and a vacuum system was added of Neodol 45 (~50% $C_{1-4}$ alcohols and ~50% $C_{1-5}$ alcohols) (105 g, 0.468 mol), para-cumylphenol (103 g, 0.486 mol), triphenyl phosphite (100 g, 0.322 mol), and 0.6 grams of potassium carbonate. The mixture was mixed well and heated to 150-152° C. under nitrogen and held at the temperature for 1 hour. The pressure was then gradually reduced to 0.3 mmHg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 3 gram of Celite 545 filter aid was added and mixed for 0.5 hours. The product was then suction filtered to give a clear, colorless, non-viscous liquid with the properties described in Table 1.

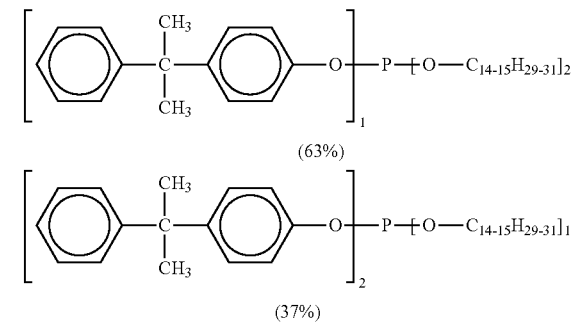

Example #10

1&2 mol 2,4 Di-Cumylphenol, 2&1 mol $C_{12-14}$ Alcohol Phosphite (Mixed $C_{12-14}$ Alkyl, 2,4-dicumylphenyl Phosphite)

To a three-neck 500 mL flask equipped with a magnetic stirrer, a distillation column connected to a receiver and a vacuum system was added of a mixture of lauryl and myristyl alcohol with a hydroxyl number of about 280 (96 g, 0.480 mol), 2,4 di-cumylphenol (160 g, 0.485 mol), triphenyl phosphite (100 g, 0.322 mol), and 0.6 grams of potassium carbonate. The mixture was mixed well and heated to 150-152° C. under nitrogen and held at the temperature for 1 hour. The pressure was then gradually reduced to 0.3 mmHg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 3 gram of Celite 545 filter aid was added and mixed for 0.5 hour. The product was then suction filtered to give a clear, colorless, non-viscous liquid with the properties described in Table 1.

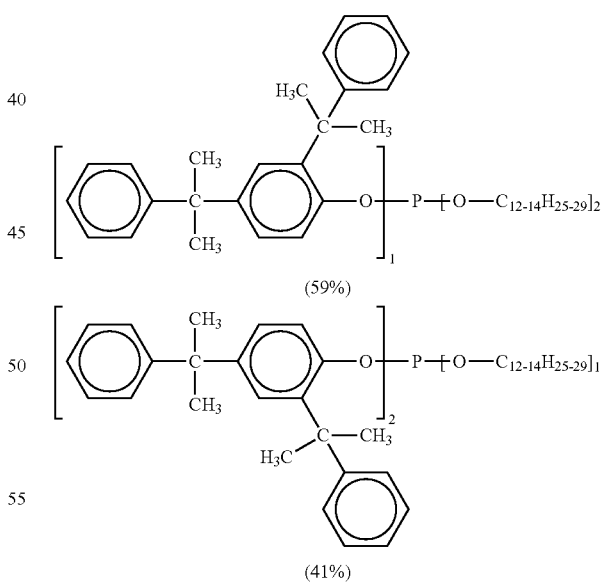

Example #11

1.5 mol Para-Cumylphenol, 0.75 mol $C_{16-18}$ Alcohol, 0.75 mol Tripropylene Glycol Phosphite To a three-neck 500 mL flask equipped with a magnetic stirrer, a distillation column connected to a receiver and a vacuum system was added of a mixture of cetyl alcohol (~28%) and stearyl alcohol (~72%) with a hydroxyl number of about 211 (64 g, 0.242 mol), tripropylene glycol butyl ether (60 g, 0.238 mol), para-cumylphenol (103 g, 0.486 mol), triphenyl phosphite (100 g, 0.322 mol), and 0.6 grams of potassium carbonate. The mixture was mixed well and heated to 150-152° C. under nitrogen and held at the temperature for 1 hour. The pressure was then gradually reduced to 0.3 mmHg and the temperature was increased to 170-172° C. over a course of 1 hour. The reaction contents were held at 160-162° C. under the vacuum for approximately 2 hours at which point no more phenol was distilling out. The vacuum was then broken by nitrogen and the crude product was cooled to ambient temperature. To the product 3 gram of Celite 545 filter aid was added and mixed for 0.5 hours. The product was then suction filtered to give a clear, colorless, non-viscous liquid with the properties described in Table 1.

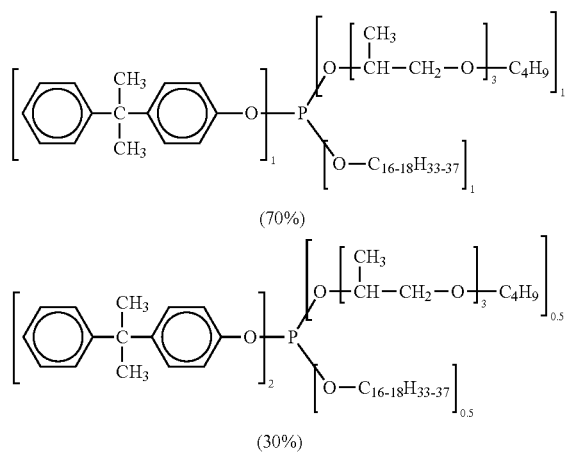

The data provided in Table I illustrates that all phosphites are liquid, have low acid numbers and the phosphorus content is approximately between 4-5.6%, with the exception of Example #10. Table II gives the properties of TNPP for comparison.

MFR. For Hunter b Color performance, a good plastic stabilizer will yield low initial color (YI) and then maintain that low color.

Sample Preparation

The polyolefin powder (polyethylene, polypropylene or high density polyethylene) is dry blended with the stabilizer formulation using a Waring blender. The mixer is run at approximately 60 rpm or a speed which does not cause the material to splash out of the bowl for 30 seconds with shaking of blender every 5 seconds. The masterbatch is then added to a preheated co-rotating twin screw extruder where the plastic is homogeneously mixed. Extrusion is typically performed at 260° C. for polyethylene (LLDPE) and polypropylene (PP) and at 250° C. for high density polyethylene (HDPE). The extruded plastic is cooled into a cold water bath, completely dried, and pelletized. The collected polymer pellets are the result of the first pass extrusion and are the starting material for all subsequent test protocols. The isolated pellets are added to the extruder repeatedly to generate the third and fifth pass material.

Melt Flow Rate Analysis

The melt flow rate was performed using the ASTM 1238-90b test method measured at 21.6 Kg/190° C. for LLDPE and HDPE compositions and at 2.16 Kg/230° C. for the PP compositions. The melt flow rate was complete on a Tinius Olsen extrusion plastometer.

Color Analysis

Color analysis was performed on compression molded films or plaques with a Hunter Lab Ulstrascan XE machine. Observations were made with a D65 illuminant and 10° observer. Yellowness Index measurements were made in accord with ASTM D1925-70.

Gas Fade Aging

Gas fade aging was performed based on methods in ASTM 1925 using a $NO_x$ gas oven. Analysis was performed on compression molded plaques placed into a 60° C. nitrogen oven.

TABLE I

| Parameter | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| --- | --- | --- | --- | --- | --- | --- | --- | --- | --- | --- | --- |
| RI/25° C. | 1.5109 | 1.5198 | 1.5350 | 1.5020 | 1.5269 | 1.5155 | 1.5215 | 1.5220 | 1.5222 | 1.5396 | 1.5170 |
| SG/25° C. | 0.981 | 0.982 | 1.017 | 0.939 | 1.000 | 0.971 | 0.991 | 0.978 | 0.984 | 1.007 | 1.007 |
| CPS/25° C. | 175 | 182 | 210 | 85 | 402 | 180 | 148 | 149 | 152 | 1205 | 181 |
| AV | 0.01 | 0.01 | 0.01 | 0.01 | 0.05 | 0.01 | 0.04 | 0.01 | 0.01 | 0.01 | 0.01 |
| % P | 5.6 | 4.8 | 5.6 | 4.1 | 5.0 | 4.4 | 4.7 | 4.3 | 4.8 | 3.9 | 4.8 |

RI = Refractive Index
SG = Specific Gravity
CPS = Viscosity (centipose)
AV = Kinematic viscosity (mPa)

TABLE II

TNPP Properties

| Parameter | TNPP |
| --- | --- |
| RI/25° C. | 1.5260 |
| SG/25° C. | 0.990 |
| CPS/25° C. | 590 |
| AV | 0.1 max |

Tables III-V, detail the performance of some of the phosphite stabilizers in polyolefins, specifically, linear low density polyethylene. These compounds show performance as plastic stabilizers that are comparable to or better than that of TNPP. With regard to Melt Flow Rate (MFR), a good plastic stabilizer will contribute to an initial MFR and then maintain the Observations were made by measuring yellowness index for color development during exposure to oxides of nitrogen.

All formulations were tested using 900 ppm of the phosphite and 500 ppm of the primary antioxidant Dovernox® 76 (octadecyl 3,5-di-t-butyl-4-hydroxyhydrocinnamate), one example of which is illustrated in FIGS. 1-3.

TABLE III

LLDPE
High load Melt Flow Stability: 190° C. (21.6 Kg)

| Phosphite | $1^{st}$ pass | $3^{rd}$ pass | $5^{th}$ pass |
| --- | --- | --- | --- |
| None | 15.3 | 13.6 | 12.8 |
| TNPP | 18.1 | 16.1 | 14.4 |
| 2 | 17.7 | 15.7 | 14.0 |

TABLE III-continued

LLDPE
High load Melt Flow Stability: 190° C. (21.6 Kg)

| Phosphite | $1^{st}$ pass | $3^{rd}$ pass | $5^{th}$ pass |
|---|---|---|---|
| 3 | 17.1 | 13.4 | 12.2 |
| 4 | 18.1 | 14.8 | 13.4 |
| 6 | 18.7 | 15.7 | 13.6 |
| 7 | 18.5 | 16.1 | 14.6 |
| 10 | 18.3 | 15.5 | 13.5 |

This table illustrates that with the exception of Example #3, the phosphites performed almost as well as TNPP in maintaining melt flow stability. The phosphites illustrates in Examples #2 and #7 performed exceptionally well.

TABLE IV

LLDPE
YI (Yellowness Index) Color Stability Data

| Phosphite | $1^{st}$ pass | $3^{rd}$ pass | $5^{th}$ pass |
|---|---|---|---|
| None | −4.8 | −2.9 | −0.1 |
| TNPP | −3.7 | −1.7 | 0.4 |
| 2 | −5.4 | −3.5 | −1.5 |
| 3 | −4.2 | −2.9 | −1.1 |
| 4 | −5.8 | −3.8 | −1.4 |
| 6 | −3.8 | −1.1 | 1.5 |
| 7 | −5.5 | −3.6 | −1.5 |
| 10 | −6.1 | −3.8 | −2.4 |

As illustrated in the above table, almost all of the tested phosphites of the invention give better color stability that TNPP.

TABLE V

YI (Yellowness Index) Color Data, Gas Fade 60° C. Using $1^{st}$ Pass

| Phosphite | 0 hrs. | 24 hrs. | 48 hrs. | 72 hrs. |
|---|---|---|---|---|
| None | −4.1 | −0.4 | 3.0 | 6.0 |
| TNPP | −3.7 | −2.4 | −1.2 | 0.7 |
| 2 | −5.6 | −2.8 | −1.0 | 1.4 |
| 3 | −4.4 | −1.4 | 1.4 | 5.0 |
| 4 | −5.6 | −2.4 | 0.3 | 1.9 |
| 6 | −3.5 | −0.9 | 0.6 | 2.4 |
| 7 | −5.4 | −3.4 | −2.1 | −1.0 |
| 10 | −5.8 | −2.5 | 1.1 | 4.1 |

Table V above illustrates that the phosphites of the invention do protect against discoloration during exposure to nitrogen oxide at 60° C. Phosphite Examples #2, #4 and #7 are especially good, while phosphite example #3 (based on $C_{10}$ is outside the invention) while phosphite example #10 (lower phosphorus content) are not as effective.

TABLE VI

PP
High load Melt Flow Stability: 230° C. (21.6 Kg)

| Phosphite (900 ppm) | $1^{st}$ pass | $3^{rd}$ pass | $5^{th}$ pass |
|---|---|---|---|
| None | 19.8 | 46.5 | 51.7 |
| TNPP | 21.4 | 30.0 | 37.0 |
| 2 | 24.2 | 33.7 | 37.9 |
| 7 | 24.2 | 34.2 | 44.4 |

TABLE VII

PP
Color Stability (YI)

| Phosphite (900 ppm) | $1^{st}$ pass | $3^{rd}$ pass |
|---|---|---|
| None | 16.0 | 18.0 |
| TNPP | 14.8 | 15.1 |
| 2 | 7.2 | 10.4 |
| 7 | 7.0 | 10.0 |

Tables VI and VII illustrate that phosphite example #s 2 and 7 of the invention both perform as well or better than TNPP in polypropylene.

TABLE VIM

HDPE
High load Melt Flow Stability: 190° C. (21.6 Kg)

| Phosphite (900 ppm) | $1^{st}$ pass | $3^{rd}$ pass | $5^{th}$ pass |
|---|---|---|---|
| None | 21.9 | 19.9 | 16.7 |
| TNPP | 22.7 | 22.5 | 18.5 |
| 2 | 22.7 | 22.2 | 17.2 |
| 7 | 23.6 | 22.2 | 17.1 |

TABLE IX

HDPE
Color Stability (YI): 230° C.

| Phosphite (900 ppm) | $1^{st}$ pass | $3^{rd}$ pass | $5^{th}$ pass |
|---|---|---|---|
| None | 2.7 | 7.2 | 11.3 |
| TNPP | −0.4 | 4.9 | 9.3 |
| 2 | 1.2 | 5.9 | 10.2 |
| 7 | −0.6 | 1.4 | 6.4 |

Tables VIII and IX illustrates that phosphite examples #2 and #7 of the invention perform as well or better than TNPP in high density polyethylene.

At least one purpose of the phosphite addition is to prevent or delay low density polyethylene crosslinking. This is usually determined by measuring melt flow after multi-extrusion. Crosslinking is indicated by a decrease in melt flow on multi-pass extrusions. Without being limited to any one theory of operation, it is believed that this addition protects the polymer against oxidation during polymer process. This improved stability is believed to result in a product which will not degrade under extruder processing conditions, and if degradation occurs, the end-products will possess less estrogenic activity than nonylphenol.

While the present invention has been directed to just a few stabilized polymer compositions which are primarily polyolefins, polyvinylchlorides, diene rubbers, etc., there is no need to limit it to such. In fact, any of the polymers known in the art are useful in this invention, a non-exhaustive and non-limiting list including polyesters, polyurethanes, polyalkylene terephthalates, polysulfones, polyimides, polyphenylene ethers, styrenic polymers, polycarbonates, acrylic polymers, polyamides, polyacetals, halide-containing polymers and polyolefin homopolymers and copolymers. Additionally included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art. However, the phosphites of the invention are particularly useful in thermoplastic polymers, such as polyolefins, polyvinyl chlorides, polydiene rubbers, particularly polybutadiene rubbers, and styrenic polymers.

Polymers of mono-olefins and di-olefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of mono-olefins and di-olefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EAA. Also included in this list would be rubbers or elastomers such as natural cis-1,4-polyisoprene rubber, synthetic cis-1,4-polyisoprene rubber, 3,4-polyisoprene rubber, styrene/butadiene copolymer rubbers, butadiene/acrylonitrile copolymer rubbers, isoprene/butadiene copolymer rubbers, styrene/isoprene/butadiene terpolymer rubbers, cis-1,4-polybutadiene rubbers, 1,3-polybutadiene rubbers as well as mixtures of such polymers and copolymers and their mixtures with polymers mentioned.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, such as acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane]terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

The resulting stabilized polymer compositions of the invention may optionally also contain various conventional additives, such as the following:

(1) Antioxidants (1.1) Alkylated monophenols, for example: 2,6-di-t-butyl-4-methylphenol, 2-t-butyl-4,6-dimethylphenol, 2,6-di-t-butyl-4-ethylphenol, 2,6-di-t-butyl-4-n-butylphenol, 2,6-di-t-butyl-4-butylphenol, 2,6-di-cyclopentyl-4-methylphenol, 2-(α-methylcyclohexyl)-4,6-dimethylphenol, 2,6-di-octadecyl-4-methylphenol, 2,4,6-tri-cyclohexylphenol, and 2,6-di-t-butyl-4-methoxymethylphenol.

(1.2) Alkylated hydroquinones, for example, 2,6-di-t-butyl-4-methoxyphenol, 2,5-di-t-butyl-hydroquinone, 2,5-di-t-amyl-hydroquinone, and 2,6-diphenyl-4-octadecyloxyphenol.

(1.3) Hydroxylated thiodiphenyl ethers, for example, 2,2'-thio-bis-(6-t-butyl-4-methylphenol), 2,2'-thio-bis-(4-octylphenol),4,4'-thio-bis-(6-t-butyl-3-methylphenol), and 4,4'-thio-bis-(6-t-butyl-2-methylphenol).

(1.4) Alkylidene-bisphenols, for example, 2,2'-methylene-bis-(6-t-butyl-4-methylphenol), 2,2'-methylene-bis-(6-t-butyl-4-ethylphenol), 2,2'-methylene-bis-[4-methyl-6-(alpha-methylcyclohexyl)phenol], 2,2'-methylene-bis-(4-methyl-6-cyclohexylphenol), 2,2'-methylene-bis-(6-nonyl-4-methylphenol), 2,2'-methylene-bis-[6-(α-methylbenzyl)-4-nonylphenol], 2,2'-methylene-bis-[6-(α,α-dimethylbenzyl)-4-nonylphenol], 2,2'-methylene-bis-(4,6-di-t-butylphenol), 2,2'-ethylidene-bis-(4,6-di-t-butylphenol), 4,4'-methylene-bis-(6-t-butyl-2-methylphenol), 1,1-bis-(5-t-butyl-4-hydroxy-2-methylphenyl)butane, 2,6-di-(3-t-butyl-5-methyl-2-hydroxybenzyl)-4-methylphenol, 1,1,3-tris-(5-t-butyl-4-hydroxy-2-methylphenyl)butane, 1,1-bis-(5-t-butyl-4-hydroxy-2-methylphenyl)-3-dodecylmercaptobutane, ethyleneglycol-bis-[3,3-bis-(3'-t-butyl-4'-hydroxy-phenyl)-butyrate], di-(3-t-butyl-4-hydroxy-5-methylphenyl)-dicyclopentadiene, and di-[2-(3'-t-butyl-2'-hydroxy-5'-methyl-benzyl)-6-t-butyl-4-methylphenyl]terephthalate.

(1.5) Benzyl compounds, for example, 1,3,5-tris-(3,5-di-t-butyl-4-hydroxybenzyl)-2,4,6-trimethylbenzene, bis(3,5-di-t-butyl-4-hydroxybenzyl)sulfide, isooctyl-3,5-di-t-butyl-4-hydroxybenzyl-mercapto-acetate, bis-(4-t-butyl-3-hydroxy-2,6-dimethylbenzyl)dithiolterephthalate, 1,3,5-tris-(3,5-di-t-butyl-4-hydroxybenzyl)isocyanurate, 1,3,5-tris(4-t-butyl-3-hydroxy-2,6-dimethylbenzyl)isocyanurate, dioctadecyl-3,5-di-t-butyl-4-hydroxybenzyl-phosphonate, calcium salt of monoethyl 3,5-di-t-butyl-4-hydroxybenzylphosphonate, and 1,3,5-tris-1,3,5-dicyclohexyl-4-hydroxybenzyl)isocyanurate.

(1.6) Acylaminophenols, for example, 4-hydroxy-lauric acid anilide, 4-hydroxy-stearic acid anilide, 2,4-bis-octylmercapto-6-(3,5-t-butyl-4-hydroxy-anilino)-s-triazine, and octyl-N-(3,5-di-t-butyl-4-hydroxyphenyl)-carbamate.

(1.7) Esters of β-(3,5-di-t-butyl-4-hydroxyphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, and dihydroxyethyl oxalic acid diamide.

(1.8) Esters of β-(5-t-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, and dihydroxyethyl oxalic acid diamide.

(1.9) Esters of β-(5-t-butyl-4-hydroxy-3-methylphenyl) propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl)isocyanurate, thiodiethylene glycol, and N,N'-bis (hydroxyethyl)oxalic acid diamide.

(1.10) Amides of β-(3,5-di-t-butyl-4-hydroxyphenyl)-propionic acid, for example, N,N'-di-(3,5-di-t-butyl-4-hydroxyphenylpropionyl)-hexamethylendiamine, N,N'-di-(3,5-di-t-butyl-4-hydroxyphenylpropionyl)-trimethylendiamine, and N,N'-di-(3,5-di-t-butyl-4-hydroxyphenylpropionyl)-hydrazine.

(2) UV Absorbers and Light Stabilizers.

(2.1) 2-(2=Hydroxyphenyl)-benzotriazoles, for example, the 5'-methyl-, 3',5'-di-t-butyl-, 5'-t-butyl-, 5'-(1,1,3,3-tetramethylbutyl)-, 5-chloro-3'-, 5'-di-t-butyl-, 5-chloro-3'-t-butyl-5'-methyl-, 3'-sec-butyl-5'-t-butyl-, 4'-octoxy, 3',5'-di-t-amyl-, and 3',5'-bis-(α,α-dimethylbenzyl)-derivatives.

(2.2) 2-Hydroxy-benzophenones, for example, the 4-hydroxy-, 4-methoxy-, 4-octoxy-, 4-decyloxy-, 4-dodecyloxy-, 4-benzyloxy-, 4,2',4'-trihydroxy- and 2'-hydroxy-4,4'-dimethoxy-derivatives.

(2.3) Esters of substituted and unsubstituted benzoic acids, for example, phenyl salicylate, 4-t-butyl-phenylsalicilate, octylphenyl salicylate, dibenzoylresorcinol, bis-(4-t-butyl-benzoyl)-resorcinol, benzoylresorcinol, 2,4-di-t-butyl-phenyl-3,5-di-t-butyl-4-hydroxybenzoate and hexadecyl-3,5-di-t-butyl-4-hydroxybenzoate.

(2.4) Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, and N-(β-carbomethoxy-β-cyano-vinyl)-2-methyl-indoline.

(2.5) Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-t-butylbenzylphosphonic acid monoalkyl esters, such as of the methyl, ethyl or butyl ester, nickel complexes of ketoximes such as of 2-hydroxy-4-methyl-pentyl undecyl ketoxime, and nickel complexes of 1-phenyl-4-lauroyl-5-hydroxy-pyrazol, optionally with additional ligands.

(2.6) Sterically hindered amines, for example bis-(2,2,6,6-tetramethylpiperidyl)-sebacate, bis-(1,2,2,6,6-pentamethylpiperidyl)-sebacate, n-butyl-3,5-di-t-butyl-4-hydroxybenzyl malonic acid, bis-(1,2,2,6,6-pentamethylpiperidyl)ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylendiamine and 4-t-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid, 1,1'-(1,2-ethanediyl)-bis-(3,3,5,5-tetramethylpiperazinone). Such amines include hydroxylamines derived from hindered amines, such as di-(1-hydroxy-2,2,6,6-tetramethylpiperidin-4-yl)sebacate; 1-hydroxy-2,2,6,6-tetramethyl-4-benzoxypiperidine; 1-hydroxy-2,2,6,6-tetramethyl-4(3,5-di-t-butyl-4-hydroxyhydrocinnamoyloxy) piperidine; and N-(1-hydroxy-2,2,6,6-tetramethylpiperidin-4-yl)-ε-caprolactam.

(2.7) Oxalic acid diamides, for example, 4,4'-di-octyloxy-oxanilide, 2,2'-di-octyloxy-5,5-di-t-butyl-oxanilide, 2,2'-di-dodecyloxy-5,5'-di-t-butyl-oxanilide, 2-ethoxy-2'-ethyl-oxanilide, N,N'-bis(3-dimethylaminopropyl)-oxalamide, 2-ethoxy-5-t-butyl-2'-ethyloxanilide and its mixture with 2-ethoxy-2'-ethyl-5,4'-di-t-butyloxanilide and mixtures of o-methoxy and p-methoxy as well as of o-ethoxy and p-ethoxy disubstituted oxanilides.

(3) Metal deactivators, for example, N,N'-diphenyloxalic acid diamide, N-salicylal-N'-salicyloylhydrazine, N,N'-bis-salicyloylhydrazine, N,N'-bis-(3,5-di-t-butyl-4-hydroxyphenylpropionyl)-hydrazine, salicyloylamino-1,2,4-triazole, bis-benzyliden-oxalic acid dihydrazide.

(4) Phosphites and phosphonites, for example triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4-di-t-butylphenyl)phosphite, diisodecyl pentaerythritol diphosphite, bis(2,4-di-t-butylphenyl)pentaerythritol diphosphite, tristearyl sorbitol triphosphite, and tetrakis(2,4-di-t-butylphenyl) 4,4'-biphenylene diphosphonite.

(5) Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc-dibutyl-dithiocarbamate, dioctadecyldisulfide, pentaerythritol-tetrakis(β-dodecylmercapto)-propionate.

(6) Polyamide stabilizers, for example copper salts in combination with iodides and/or phosphorus compounds and salts of divalent manganese.

(7) Basic co-stabilizers, for example, malamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, barium stearate, magnesium stearate, sodium ricinoleate, potassium palmitate, antimony pyrocatecholate and zinc pyrocatecholate.

(8) Nucleating agents, for example, 4-t-butyl-benzoic acid, adipic acid, diphenylacetic acid.

(9) Fillers and reinforcing agents, for example, calcium carbonate, silicates, glass fibers, asbestos, talc, kaolin, mica, barium sulfate, metal oxides and hydroxides, carbon black, graphite.

(10) Aminoxy propanoate derivatives such as methyl-3-[N,N-dibenzylaminoxy]propanoate; ethyl-3-[N,N-dibenzylaminoxy]propanoate; 1,6-hexamethylene-bis[3-(N,N-dibenzylaminoxy)propanoate]; methyl-[2-(methyl)-3(N,N-dibenzylaminoxy)propanoate]; octadecyl-3-[N,N-dibenzylaminoxy]propanoic acid; tetrakis[(N,N-dibenzylaminoxy) ethyl carbonyl oxymethyl]methane; octadecyl-3-[N,N-diethylaminoxy]propanoate; 3-[N,N-dibenzylaminoxy] propanoic acid potassium salt; and 1,6-hexamethylene bis[3-(N-allyl-N-dodecyl aminoxy)propanoate].

(11) Other additives, for example, plasticizers, lubricants, emulsifiers, pigments, optical brighteners, flame-proofing agents, anti-static agents, blowing agents and thiosynergists such as dilaurylthiodipropionate or distearylthiodipropionate.

Hindered phenolic antioxidants may also be present in the polymer composition. Use of bis-aralkylphenyl pentaerythritol diphosphites of the present invention may result in enhanced polymer protection by reducing the formation of color resulting from the presence of the phenols. Such phenolic antioxidants include in addition to those specifically mentioned previously, n-octadecyl-3,5-di-t-butyl-4-hydroxyhydrocinnamate, neopentanetetrayl tetrakis-(3,5-di-t-butyl-4-hydroxyl-hydrocinnamate), di-n-octadecyl-3,5-di-t-butyl-4-hydroxybenzyl-phosphonate, 1,3,5-tris(3,5-di-t-butyl-4-hydroxybenzyl-)isocyanurate, thiodiethylene-bis(3,5-di-t-butyl-4-hydroxyhydrocinnamate), 1,3,5-trimethyl-2,4,6-tris(3,5-di-t-butyl-4-hydroxybenzyl)benzene, 3,6-dioxaoctamethylene bis(3-methyl-5-t-butyl-4-hydroxyhydrocinnamate), 2,6-di-t-butyl-p-cresol, 2,2'-ethylidene-bis(4,6-di-t-butylphenol), 1,3,5-tris-(2,6-dimethyl-4-t-butyl-3-hydroxybenzyl)isocyanurate, 1,1,3-tris-(2-methyl-4-hydroxy-5-t-butylphenyl)butane, 1,3,5-tris[2-(3,5-di-t-butyl-4-hydroxyhydrocinnamoloxy)-ethyl]-isocyanurate, 3,5-di-(3,5-di-t-butyl-4-hydroxybenzyl)-mesitol, hexamethylene-bis(3,5-di-t-butyl-4-hydroxyhydrocinnamate), 1-(3,5-di-t-butyl-4-hydroxyanilino)-3,5-di(octylthio)-s-triazine, N,N'-hexamethylene-bis(3,5-di-t-butyl-4-hydroxyhydrocinnamamide), calcium bis(ethyl-3,5-di-t-butyl-4-hydroxybenzylphosphonate), ethylene bis[3,3-di(3-t-butyl-4-hydroxyphenyl)butyrate], octyl 3,5-di-t-butyl-4-hydroxybenzylmercaptoacetate, bis(3,5-di-t-butyl-4-hydroxyhydrocinnamoyl)hydrazide, and N,N'-bis-[2-(3,5-t-butyl-4-hydroxyhydroxocinnamoyloxy)-ethyl]-oxamide, and preferably neopentanetetrayltetrakis(3,5-di-t-butyl-4-hydroxyhydrocinnamate), n-octadecyl-3,5-di-t-butyl-4-hydroxyhydrocinnamate, 1,3,5-trim ethyl-2,4,6-tris(3,5-di-t-butyl-4-hydroxy-benzyl)benzene, 1,3,5-tris-(3,5-di-t-butyl-4-hydroxybenzyl)isocyanurate, 2,6-di-t-butyl-p-cresol or 2,2'-ethylidene-bis(4,6-di-t-butylphenol).

Other additives, such as oxazapholidines, may additionally or alternatively be present. Likewise, the instant compounds prevent color formation when hindered amine light stabilizers are present, such hindered amines including bis(1,2,2,6,6-pentamethyl-4-piperidyl)-2-n-butyl-2-(3,5-di-t-butyl-4-hydroxy-benzyl)malonate; bis(2,2,6,6-tetramethyl-4-piperidyl)sebacate; dim ethylsuccinate polymer with 4-hydroxy-2,2,6,6-tetramethyl-1-piperidinethanol; and polymers of 2,4-dichloro-6-octylamino-s-triazine with N'-(2,2,6,6-tetramethyl-4-piperidyl)hexamethylene diamine.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process to stabilize a polymer comprising the step of adding a phosphite of formula (I), said phosphite having less estrogenic activity when compared to polymer blends which use tris(nonylphenyl) phosphite:

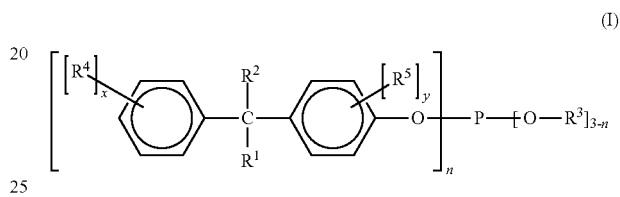

wherein
$R^1$ is independently selected from the group consisting of H and $C_{1-2}$ alkyls;
$R^2$ is independently selected from the group defined previously for $R^1$;
x is an integral value ranging from 0 to 4 inclusive;
y is an integral value ranging from 0 to 4 inclusive;
n is an integral value ranging from 1 to 2;
$R^3$ is independently selected from the group consisting of $C_{12-20}$ alkyl or $C_{12-20}$ alkenyl;
$R^4$ is independently selected from the group consisting of $C_{1-10}$ alkyl and $C_{9-15}$ arylalkyl;
$R^5$ is independently selected from the group defined previously for $R^4$.

2. The process of claim 1 wherein
formula (I) is as illustrated in formula (II) and comprises a combination of monophosphites and diphosphites illustrated below,

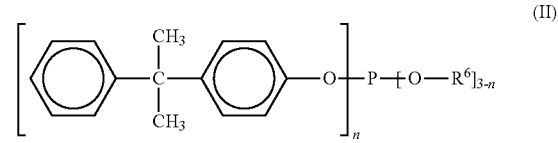

wherein
$R^6$ is selected from the group consisting of $C_{12-18}$ alkyl and $C_{12-18}$ alkenyl; and
n is 1 or 2.

3. The process of claim 1 wherein formula (I) comprises a combination of monophosphites and diphosphites of $C_{12-14}$ alkyl, p-cumylphenyl phosphites illustrated below

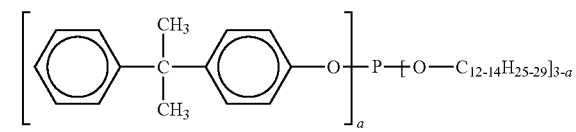

wherein
a is 1 or 2.

4. The process of claim 1 wherein formula (I) comprises a combination of monophosphites and diphosphites of $C_{18}$ alkenyl, p-cumylphenyl phosphates illustrated below

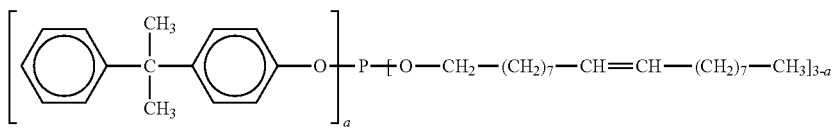

wherein
a is 1 or 2.

5. The process of claim 1 wherein formula (I) comprises a combination of monophosphites and diphosphites of $C_{12-14}$ alkyl, p-cumylphenyl phosphites illustrated below

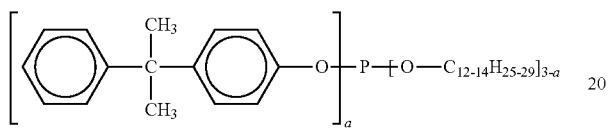

wherein
a is 1 or 2.

6. The process of claim 1 wherein formula (I) comprises a combination of monophosphites and diphosphites of $C_{16-18}$ alkyl, p-cumylphenyl phosphites illustrated below

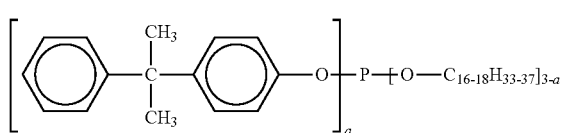

wherein
a is 1 or 2.

7. The process of claim 1 wherein formula (I) comprises a combination of monophosphites and diphosphites of $C_{12-18}$ alkyl, p-cumylphenyl phosphites illustrated below

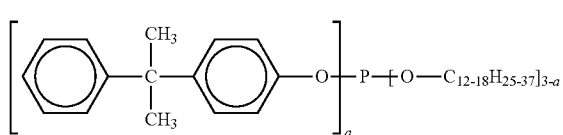

wherein
a is 1 or 2.

8. The process of claim 1 wherein formula (I) comprises a combination of monophosphites and diphosphites of $C_{18}$ alkenyl, p-cumylphenyl phosphites illustrated below

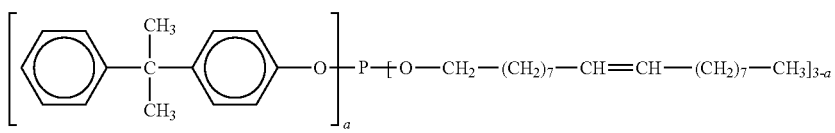

wherein
a is 1 or 2.

9. The process of claim 1 wherein formula (I) comprises a combination of monophosphites and diphosphites of $C_{14-15}$ alkyl, p-cumylphenyl phosphites illustrated below

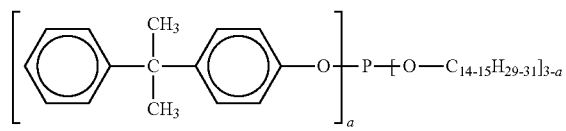

wherein
a is 1 or 2.

10. The process of claim 1 wherein formula (I) comprises a combination of monophosphites and diphosphites of $C_{12-14}$ alkyl, p-cumylphenyl phosphites illustrated below

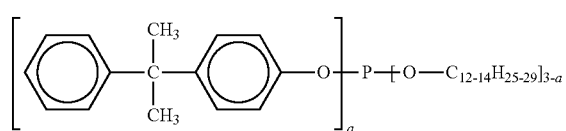

wherein
a is 1 or 2.

11. The process of claim 1 wherein formula (I) comprises a combination of monophosphites and diphosphites of $C_{16-18}$ alkyl, tripropylene glycol, p-cumylphenyl phosphites illustrated below

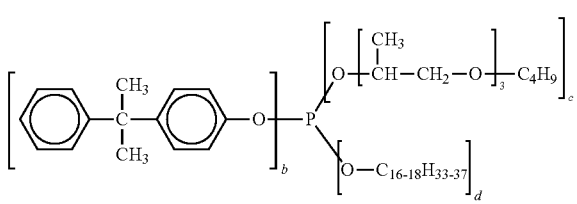

wherein
b is 1 or 2;
c is 0.5 or 1;
d is 0.5 or 1;
and further wherein b+c+d=3.

12. The process of claim 1 wherein
said polymer is selected from the group consisting of polyolefins, polyvinyl chloride and SBR rubbers.

13. The process of claim 12 wherein
said polyolefin is selected from the group consisting of high density polyethylene, medium density polyethylene, low density polyethylene, linear low density polyethylene and polypropylene.

14. The process of claim 1 wherein
said phosphites are added at a level of between 0.01 to 2% by weight of said polymer.

15. The process of claim 14 wherein
said phosphites perform in a manner which is similar to tris(nonylphenyl) phosphite in said polymers, yet provide less estrogenic activity when compared to polymers which use tris(nonylphenyl) phosphite.

* * * * *

UNITED STATES PATENT AND TRADEMARK OFFICE
CERTIFICATE OF CORRECTION

PATENT NO. : 8,258,215 B2
APPLICATION NO. : 12/701121
DATED : September 4, 2012
INVENTOR(S) : Jakupca et al.

It is certified that error appears in the above-identified patent and that said Letters Patent is hereby corrected as shown below:

Column 4; Line 20: delete "dim ethylcycloheptyl" and insert --dimethylcycloheptyl--.

Column 21; Line 61: delete "trim ethyl" and insert --trimethyl--.

Column 22; Line 3: delete "dim ethylsuccinate" and insert --dimethylsuccinate--.

Signed and Sealed this
Twentieth Day of November, 2012

David J. Kappos
*Director of the United States Patent and Trademark Office*